(12) United States Patent
Cheshire (10) Patent No.: US 9,542,345 B2
(45) Date of Patent: Jan. 10, 2017

(54) INTERRUPT SUPPRESSION STRATEGY

(71) Applicant: Apple Inc., Cupertino, CA (US)

(72) Inventor: Stuart D. Cheshire, San Jose, CA (US)

(73) Assignee: Apple Inc., Cupertino, CA (US)

(*) Notice: Subject to any disclaimer, the term of this patent is extended or adjusted under 35 U.S.C. 154(b) by 671 days.

(21) Appl. No.: 13/631,305

(22) Filed: Sep. 28, 2012

(65) Prior Publication Data

US 2014/0095752 A1 Apr. 3, 2014

(51) Int. Cl.
*G06F 13/24* (2006.01)
*G06F 9/48* (2006.01)

(52) U.S. Cl.
CPC ............. *G06F 13/24* (2013.01); *G06F 9/4812* (2013.01); *Y02B 60/1228* (2013.01)

(58) Field of Classification Search
CPC ....... G06F 13/24; G06F 9/4812; G06F 1/3203
USPC ......................................................... 710/262
See application file for complete search history.

(56) References Cited

U.S. PATENT DOCUMENTS

| | | | | |
|---|---|---|---|---|
| 5,717,870 A * | 2/1998 | Dobson | | 709/250 |
| 5,717,932 A * | 2/1998 | Szczepanek et al. | | 710/260 |
| 6,351,785 B1 * | 2/2002 | Chen et al. | | 710/263 |
| 6,438,628 B1 * | 8/2002 | Messerly | G06F 13/385 | 710/262 |
| 6,615,305 B1 * | 9/2003 | Olesen et al. | | 710/262 |
| 6,958,961 B2 * | 10/2005 | Tsukihashi | G11B 20/10527 | 369/47.33 |
| 7,107,442 B2 | 9/2006 | Cheshire | | |
| 7,188,203 B2 * | 3/2007 | Mowry et al. | | 710/262 |
| 7,260,664 B2 * | 8/2007 | Arndt et al. | | 710/266 |
| 7,532,862 B2 | 5/2009 | Cheshire | | |
| 7,676,610 B2 * | 3/2010 | Nakashima et al. | | 710/48 |
| 7,757,108 B2 | 7/2010 | Cheshire | | |
| 7,797,438 B2 * | 9/2010 | Haydock | H04N 21/434 | 709/231 |
| 8,037,227 B2 * | 10/2011 | Weissman | | 710/260 |
| 8,065,493 B2 * | 11/2011 | Burchard | G06F 13/1673 | 711/154 |
| 8,214,670 B2 * | 7/2012 | Ishikura et al. | | 713/310 |
| 8,364,877 B2 * | 1/2013 | Mukherjee et al. | | 710/269 |
| 8,478,922 B2 * | 7/2013 | Belmar et al. | | 710/262 |
| 8,489,862 B2 * | 7/2013 | Saito et al. | | 712/43 |
| 8,554,968 B1 * | 10/2013 | Onufryk et al. | | 710/260 |
| 8,612,658 B1 * | 12/2013 | Lachwani | | 710/262 |
| 8,612,661 B2 * | 12/2013 | Shimada | | 710/264 |
| 8,612,711 B1 * | 12/2013 | Griffin | | 711/165 |
| 2004/0054822 A1 * | 3/2004 | Biran et al. | | 710/15 |

* cited by examiner

*Primary Examiner* — Brian Misiura
(74) *Attorney, Agent, or Firm* — Sterne, Kessler, Goldstein & Fox PLLC (57) ABSTRACT

The disclosed embodiments provide a system that suppresses interrupts to facilitate efficient use of a processor in a computer system. The system includes a node that transmits a first interrupt to the processor upon receiving a first packet for processing at the processor and disables subsequent interrupts to the processor during an interrupt-suppression state in the processor. The system also includes the processor, which processes the first packet upon receiving the first interrupt and transmits a first acknowledgment of the first packet to the node to enable the interrupt-suppression state.

22 Claims, 6 Drawing Sheets

INTERRUPT SUPPRESSION STRATEGY

BACKGROUND

Field

The disclosed embodiments relate to techniques for facilitating interactions involving interrupts in computer systems. More specifically, the disclosed embodiments relate to techniques for coordinating and suppressing interrupts in network interfaces and/or computer systems.

Related Art

On busy networks, interrupting the host processor (e.g., a central-processing unit (CPU)) immediately for every received packet increases power consumption by forcing the processor to exit low-power states to handle the packet. This is especially wasteful when the packet in question turns out not to be relevant to the receiving host or turns out not to require immediate processing, as is often the case with broadcast and multicast packets. One approach to solve this has been to place some or all of the packet-processing intelligence in the network interface hardware, but this can be error prone, and requires the network interface hardware to be more capable, increasing the power requirements of that subsystem.

Another approach has been to delay interrupting the processor in the expectation that further packets will arrive, so that a batch of packets can be delivered with a single interrupt, but this also has problems. On relatively idle networks, no further packets may arrive during the delay period, with the result that after the delay expires, the interrupt still delivers only a single packet. Moreover, the enforced wait can adversely affect handling of packets that are time-sensitive. As a result, the delay may cause degradation in overall performance and user experience without yielding any beneficial energy savings. Delaying the completion of a sequence of network operations may also increase the overall energy consumption for a given task, because other system components (e.g., screen and back-lighting) continue to consume full power while waiting for the artificially slowed network operations to complete.

Hence, what is needed is a mechanism for interrupting processors in computer systems without the limitations described above.

SUMMARY

The disclosed embodiments provide a system that suppresses interrupts to facilitate efficient use of a processor in a computer system. The system includes a node that transmits a first interrupt to the processor upon receiving a first packet for processing at the processor and disables subsequent interrupts to the processor during an interrupt-suppression state. The system also includes the processor, which processes the first packet upon receiving the first interrupt and transmits a first acknowledgment of the first packet to the node to enable the interrupt-suppression state.

In some embodiments, upon receiving a second packet for processing at the processor, the node also transmits a second interrupt to the processor after a pre-specified threshold associated with the interrupt-suppression state is met. Next, the processor processes the second packet upon receiving the second interrupt and transmits a second acknowledgment of the second packet to the node to re-enable the interrupt-suppression state. The node and processor may thus provide prompt processing of the first packet while reducing the overall frequency of interrupts to the processor.

In some embodiments, the pre-specified threshold is associated with a time interval or an amount of data in a buffer for the first and second packets. For example, the interrupt-suppression state may be enabled until the time interval has passed and/or the number of packets and/or bytes occupied by the packets in a buffer exceeds a certain percentage of the buffer's capacity.

In some embodiments, transmitting the second interrupt to the processor after the pre-specified threshold is met involves determining the time interval based on an attribute of the second packet, and transmitting the second packet after the time interval has passed.

In some embodiments, the time interval is based on an attribute of the second packet, such as a type of the second packet, a source address for the second packet, and/or a destination address for the second packet.

In some embodiments, the time interval is tracked using a table of time intervals associated with different attributes of the second packet.

In some embodiments, the first interrupt is transmitted from the node when the processor is not in the interrupt-suppression state.

In some embodiments, the interrupt-suppression state is associated with a low-power state of the processor and/or thread-level processing at the processor.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
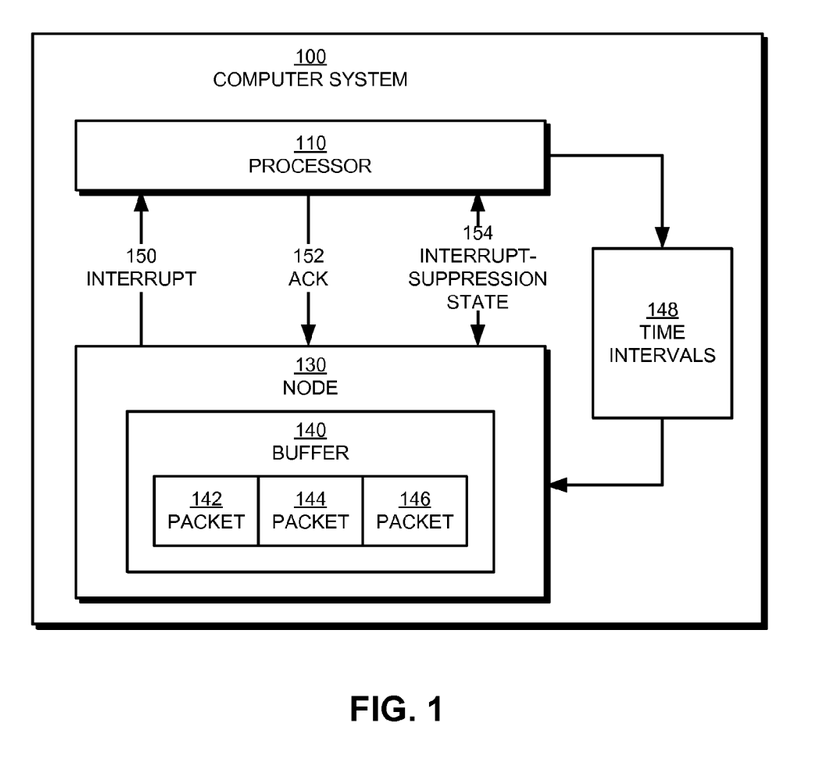
FIG. 1 shows a schematic of a system in accordance with the disclosed embodiments.

The disclosed embodiments provide a method and system for suppressing interrupts to facilitate efficient use of a processor in a computer system. As shown in FIG. 1, a computer system 100 may include a processor 110 such as a central-processing unit (CPU) and a node 130 such as a network interface controller, disk controller, peripheral device, and/or other device with functionality to communicate with processor 110. During normal operation, processor 110 may perform thread-level processing that executes an operating system and/or one or more applications on computer system 100. In the absence of such thread-level processing, processor 110 may enter a low-power state to conserve power in computer system 100.

To communicate with processor 110, node 130 may generate an interrupt 150 that alerts processor 110 to a high-priority event. For example, node 130 may transmit interrupt 150 to signal the arrival of one or more packets 142-146 (e.g., network packets, Peripheral Component Interconnect Express (PCIe) packets, Serial ATA (SATA) packets, Inter-Integrated Circuit ($I^2C$) packets, etc.) in a buffer 140 for processing by processor 110. In turn, interrupt 150 may cause processor 110 to exit the low-power state and/or suspend thread-level processing to process packets 142-146 and/or otherwise handle interrupt 150.

Frequent interrupts (e.g., interrupts 150) to processor 110 by node 130 and/or other nodes on computer system 100 may thus degrade the performance and/or increase the power consumption of processor 110. For example, node 130 may interrupt processor 110 for every packet (e.g., packets 142-146) received by node 130 over a network interface, disk interface, bus interface, and/or other type of interface. If node 130 receives such packets at a high frequency, node 130 may generate interrupts hundred or thousands of times a second, preventing processor 110 from performing thread-level processing and/or staying in a low-power state for more than a few milliseconds at a time. Frequent interrupting of processor 110 may be particularly inefficient and/or unnecessary if many of the packets associated with the interrupts do not require immediate processing.

Moreover, conventional techniques for reducing the frequency of interrupts to processors may be associated with a number of drawbacks. For example, node 130 may enforce a delay between the arrival of a packet (e.g., packets 142-146) and the transmission of an interrupt (e.g., interrupt 150) for the packet to processor 110. Such a delay may allow a batch of packets in buffer 140 to be processed with a single interrupt, but may also adversely affect the timely processing of time-sensitive packets. Consequently, a delay that is large enough to increase the processing efficiency of processor 110 may result in a noticeable degradation of performance, while a delay that is small enough to avert such degradation may not produce any meaningful gain in efficiency. In other words, the inherent tradeoff between performance and batch-processing efficiency in the use of such delays may facilitate neither efficient nor high-performance processing of the packets by processor 110. Moreover, packets that are received infrequently (e.g., from mostly idle networks and/or interfaces) may be separated by greater than the delay period, resulting in both the generation of an interrupt for each packet and the delayed processing of the packet.

In one or more embodiments, the system of FIG. 1 includes functionality to improve both the efficiency and performance of packet processing on processor 110. In particular, when node 130 first receives a packet (e.g., packets 142-146), node 130 may immediately (e.g., without delay) signal an interrupt (e.g., interrupt 150) to processor 110. The interrupt may allow processor 110 to process the first packet and/or other packets received in buffer 140 during handling of the interrupt in a timely manner.

After the packet(s) are processed, processor 110 may transmit an acknowledgment 152 of the packet(s) to node 130 to enable an interrupt-suppression state 154 in processor 110. During interrupt-suppression state 154, interrupts to processor 110 may be suppressed to allow processor 110 to transition to a low-power state, thereby reducing power consumption in computer system 100. Alternatively, interrupt-suppression state 154 may allow processor 110 to resume thread-level processing that was suspended to handle the interrupt.

In one or more embodiments, interrupt-suppression state 154 is maintained until a pre-specified threshold is met. The pre-specified threshold may be associated with one or more time intervals 148 and/or the amount of data in buffer 140. First, node 130 may keep processor 110 in interrupt-suppression state 154 for a time interval after acknowledgment 152 is received. Any packets received by node 130 during the time interval may be stored in buffer 140 until the time interval has passed. Node 130 may then transmit a second interrupt to trigger processing of the packets in buffer 140 by processor 110. Processing of packets based on interrupt-suppression states and/or time intervals is discussed in further detail below with respect to FIG. 2.

Second, node 130 may maintain interrupt-suppression state 154 until the amount of buffer 140 occupied by the received packets 142-146 reaches a certain level. For example, node 130 may mitigate packet loss by interrupting processor 110 after detecting an increase in the number of packets and/or bytes stored in buffer 140 to more than 50% of the capacity of buffer 140. Processing of packets based on the amount of data in buffers for the packets is discussed in further detail below with respect to FIG. 3.

Node 130 may further manage the transmission and suppression of interrupts to processor 110 based on the attributes of packets 142-146. For example, node 130 may be a network interface controller that tracks time intervals 148 for different types of network packets received during interrupt-suppression state 154. A multicast and/or broadcast packet (e.g., multicast Domain Name System (mDNS) packet, Address Resolution Protocol (ARP) packet, neighbor discovery (ND) packet, service discovery packet, etc.) may be associated with a time interval of 100 ms before an interrupt for the packet may be generated. On the other hand, a unicast packet such as a Transmission Control Protocol (TCP) packet may be associated with a much shorter time interval of 1 ms to facilitate timely processing of the unicast packet. This translates to an interrupt rate of 1000 interrupts per second for TCP (which is appropriate if a large bulk transfer is in progress) but only 10 interrupts per second for service discovery (which is a sufficient reduction to yield significant power savings). On a mostly-idle network, where packet-handling power consumption is not a significant concern, all packets would generally be delivered with no delay.

Time intervals 148 may also be based on the source and/or destination addresses of packets 142-146. For example, packets with source and/or destination Internet Protocol (IP) and/or Media Access Control (MAC) addresses that are associated with high priorities may have shorter time intervals than packets with source and/or destination addresses that are associated with lower priorities.

To track time intervals 148 for different packet types and/or addresses, node 130 may maintain a table of time intervals 148 associated with different attributes of packets that may be received by node 130. After an acknowledgment (e.g., acknowledgment 152) is received from processor 110, each entry in the table may be updated with a new value representing the end of the corresponding time interval. Continuing with the above example, the entry for multicast and/or broadcast packets may be set to 100 ms after the acknowledgment is received, while the entry for unicast packets may be set to 1 ms after the acknowledgment is received. If a multicast packet is received 10 ms after the acknowledgment, node 130 may wait another 90 ms before interrupting processor 110. However, if a unicast packet is received 5 ms after the multicast packet, node 130 may immediately interrupt processor 110, causing processor 110 to process both packets.

Those skilled in the art will appreciate that time intervals 148 may be specified to node 130 in a number of ways. For example, time intervals 148 may be stored in nonvolatile memory that is read by node 130 while computer system 100 is booting. Node 130 may then use values for time intervals 148 and timestamps associated with receipt of acknowledgments from processor 110 to populate and/or refresh the table used to track time intervals 148. Alternatively, values for time intervals 148 may be adjusted by processor 110 before each re-enabling of interrupt-suppression state 154. Node 130 may obtain the adjusted values through acknowledgments from processor 110, direct memory access (DMA), and/or another mechanism and use the adjusted values to compute new time intervals 148 for each re-enabled interrupt-suppression state 154.

Consequently, the system of FIG. 1 may enforce a "quiet time" where node 130 is not allowed to interrupt processor 110 while imposing a delivery delay on the next packet only if the packet is received during the "quiet time." In the event that no packet is received during the "quiet time," the next packet to be received is delivered without additional delay. On mostly idle networks, most packets are treated as "first packets" and delivered immediately. On networks that are busy enough for additional packets to arrive before one or more time intervals 148 for interrupt-suppression state 154 have passed, packets are delivered in batches with a delay appropriate for the "most urgent" packet in the batch. This allows a single implementation to deliver packets immediately on mostly idle networks and save power by delivering appropriate batches of packets on busy networks.

Figure 2:
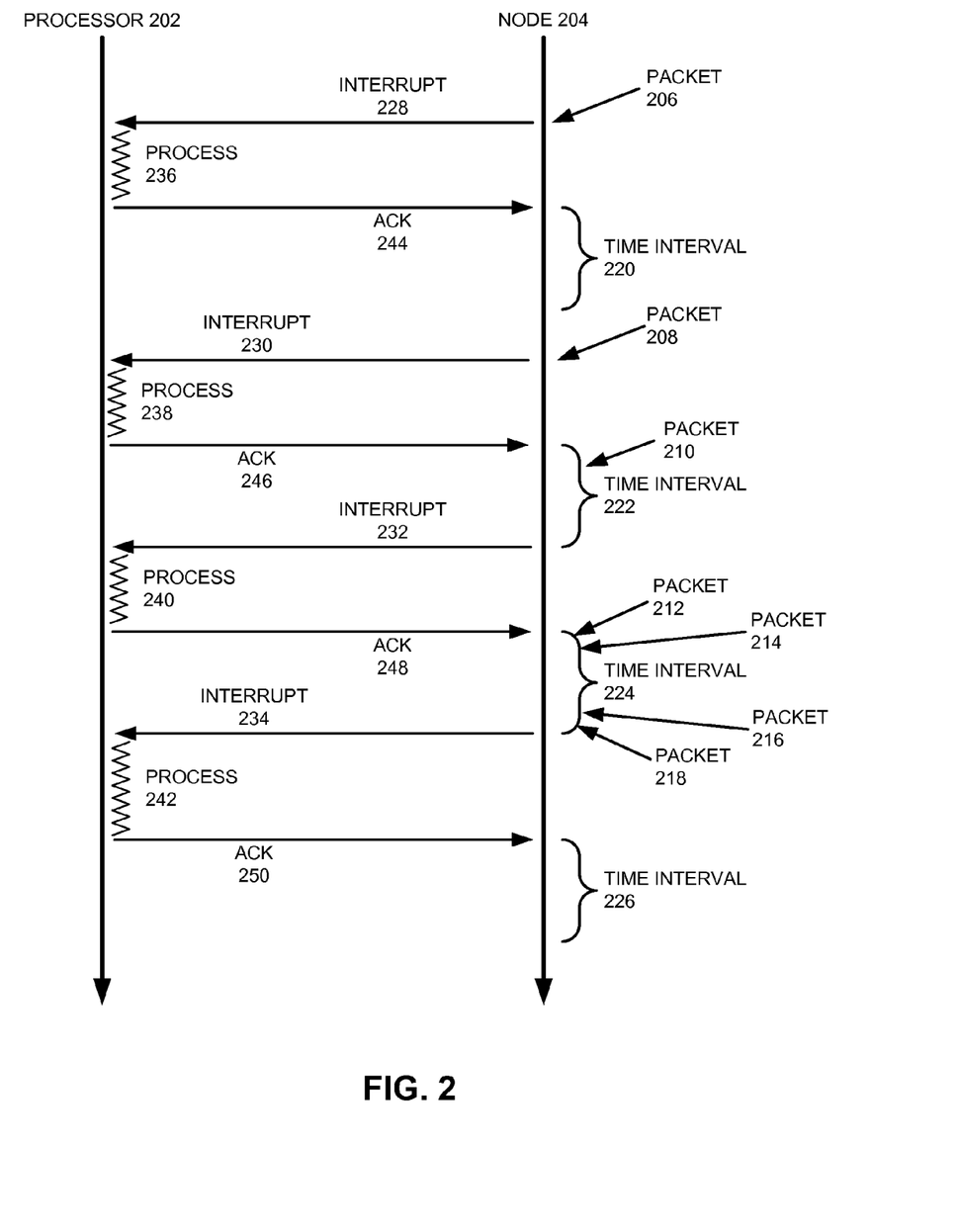
FIG. 2 shows an exemplary timeline of operations between a processor and a node in accordance with the disclosed embodiments.

FIG. 2 shows an exemplary timeline of operations between a processor 202 and a node 204 in accordance with the disclosed embodiments. More specifically, FIG. 2 shows a timeline of receiving and processing a series of packets 206-218 by processor 202 and node 204. As shown in FIG. 2, a first packet 206 may arrive at node 204 and trigger an immediate interrupt 228 from node 204 to processor 202. Upon receiving interrupt 228, processor 204 may process 236 packet 206. After packet 206 is processed, processor 202 may transmit an acknowledgment 244 to node 204, and node 204 may suppress interrupts to processor 202 for a time interval 220 following the receipt of acknowledgment 244.

Next, another packet 208 may arrive at node 204 after time interval 220 has passed. As a result, node 204 may treat packet 208 as another "first" packet and transmit a second interrupt 230 to processor 202 immediately after receiving packet 208. Processor 202 may process 238 packet 208 during handling of interrupt 230 and transmit acknowledgment 246 to node 204 to signal the end of such processing. Node 204 may then suppress interrupts to processor 202 during a second time interval 222 following the receipt of acknowledgment 246.

Consequently, the arrival of a third packet 210 during time interval 222 may not be immediately communicated by node 204. Instead, node 204 may wait until time interval 222 has passed to transmit a third interrupt 232 to processor 202, allowing processor 202 to process 240 packet 210 and respond with an acknowledgment 248. Acknowledgment 248 may then trigger the suppression of interrupts over a third time interval 224.

During time interval 224, four packets 212-218 may arrive at node 204. Once time interval 224 has passed, node 204 may signal a fourth interrupt 234 to processor 202, and processor 202 may process 242 packets 212-218 and/or other packets received by node 204 during handling of interrupt 234. Finally, processor 202 may transmit an acknowledgment 250 to node 204, prompting node 204 to suppress interrupts to processor 202 for a fourth time interval 226.

Figure 3:
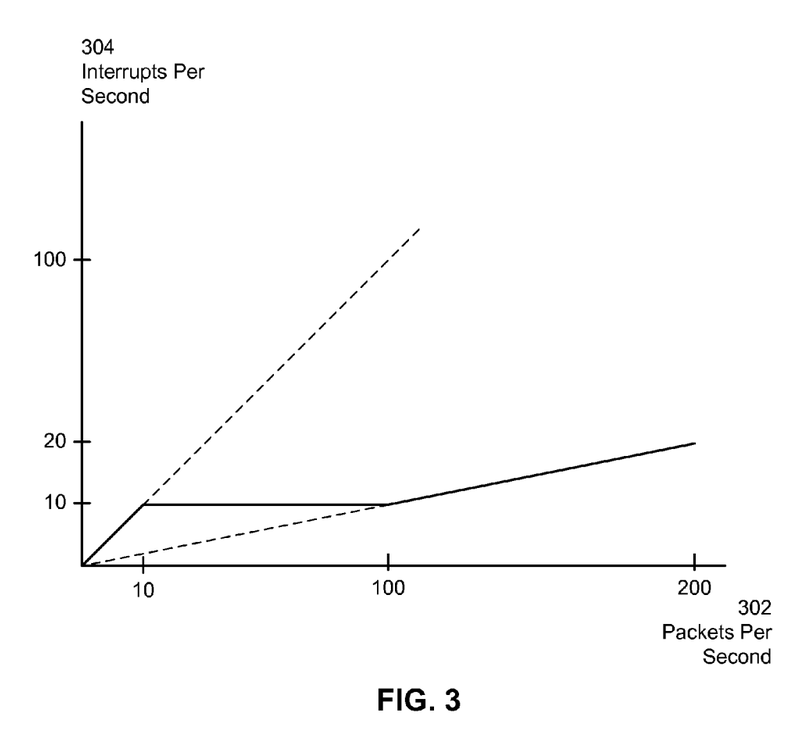
FIG. 3 shows an exemplary plot in accordance with the disclosed embodiments.

FIG. 3 shows an exemplary plot in accordance with the disclosed embodiments. In particular, FIG. 3 shows an exemplary plot of interrupts per second 304 for a processor (e.g., processor 110 of FIG. 1) with an interrupt-suppression state time interval of 100 ms as a function of a number of packets per second 302 received by a node (e.g., node 130 of FIG. 1) communicating with the processor. As shown in FIG. 3, for 0-10 packets per second 302, the interrupt rate is 1:1, up to 10 interrupts per second 304. In other words, each packet received up to 10 packets per second 302 may trigger a separate interrupt to the processor.

Next, the interrupt rate may remain constant at 10 interrupts per second 304 for 10-100 packets per second 302. For example, the receiving of 10-100 packets per second 302 may trigger the generation of an interrupt after every 100-ms time interval of interrupt suppression has passed.

Finally, the interrupt rate increases slowly above 100 packets per second 302, at $\frac{1}{10}$ the packet arrival rate. For example, at 200 packets per second 302, the interrupt rate is limited to 20 interrupts per second 302. On the other hand, 200 interrupts would be generated per second in the naïve 1:1 case (e.g., without interrupt suppression), as indicated by the dotted line extending from the first sloping segment between 0 and 10 packets per second 302.

The increase in interrupt rate above 100 packets per second 302 may be caused by a 10-packet threshold in a buffer for the packets that is reached by the packets, which triggers an interrupt before the time interval has passed. In addition, the dotted line extending back to the origin from the second sloping segment after 100 packets per second 302 may represent the interrupt rate if interrupts are generated only when the threshold in the buffer is reached. For example, one interrupt per second may be generated for 10 packets received per second if interrupts are suppressed until 10 packets arrive at the buffer.

Figure 4:
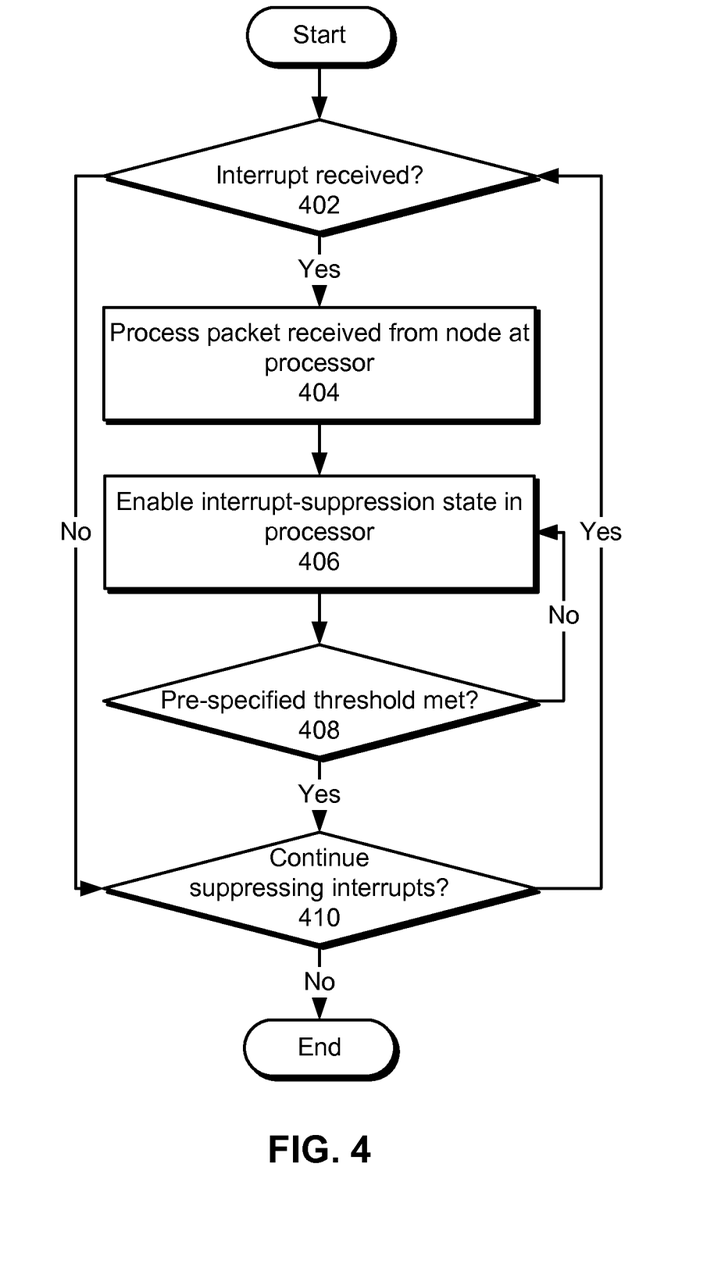
FIG. 4 shows a flowchart illustrating the process of suppressing interrupts to facilitate efficient use of a processor in a computer system in accordance with the disclosed embodiments.

FIG. 4 shows a flowchart illustrating the process of suppressing interrupts to facilitate efficient use of a processor in a computer system in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, an interrupt may be received from a node to the processor (operation 402). For example, the node may transmit the interrupt upon receiving a packet over a network interface, bus interface, storage device interface, and/or other type of interface. If no interrupt is received, no interrupt handling is performed by the processor. Instead, the processor may perform thread-level processing and/or be placed in a low-power state to conserver power.

If an interrupt is received, a packet received from the node is processed at the processor (operation 404). For example, the interrupt may cause the processor to execute an interrupt handler that processes the packet and/or other packets received by the node during handling of the interrupt.

Next, an interrupt-suppression state is enabled in the processor (operation 406). The processor may enable the interrupt-suppression state by transmitting an acknowledgment of the packet to the node. During the interrupt-suppression state, subsequent interrupts from the node to the processor may be suppressed until a pre-specified threshold is met (operation 408). For example, the processor may not receive interrupts from the node until a time interval has passed and/or the amount of data in a buffer for packets received by the node exceeds a certain level. If the pre-specified threshold is not met, the interrupt-suppression state is maintained (operation 406).

Once the pre-specified threshold is met, interrupts may continue to be suppressed (operation 410) based on the interrupt-suppression state and/or one or more pre-specified thresholds (operations 402-408). If suppression of interrupts is to continue, interrupts may be received by the processor (operation 402) when the processor is not in the interrupt-suppression state, and one or more packets associated with the interrupts may be processed by the processor (operation 404). After the packet(s) are processed, the processor may re-enable the interrupt-suppression state (operation 406) until a pre-specified threshold is met (operation 408). Such processing of packets may continue until interrupt suppression is disabled for the processor and/or the processor is no longer used to process the packets.

Figure 5:
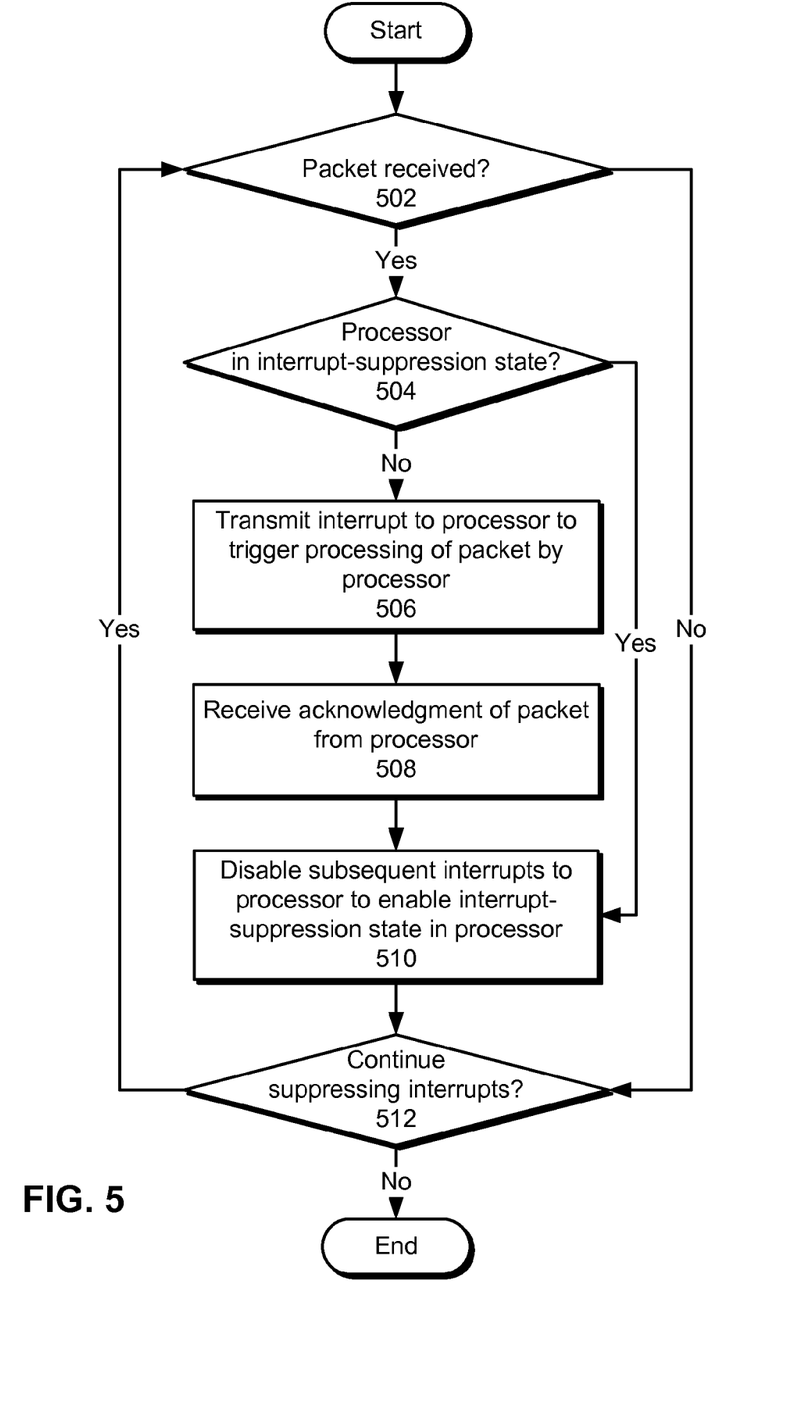
FIG. 5 shows a flowchart illustrating the process of suppressing interrupts to facilitate efficient interaction with a processor in a computer system in accordance with the disclosed embodiments.

FIG. 5 shows a flowchart illustrating the process of suppressing interrupts to facilitate efficient interaction with a processor in a computer system in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

As mentioned above, interaction with the processor may be based on the receipt of a packet (operation 502) for processing by the processor. For example, the packet may be received over a network interface, bus interface, storage device interface, and/or other interface by a node in the computer system. If no packets are received, no communication with the processor is made.

If a packet is received, the packet may be handled based on an interrupt-suppression state in the processor (operation 504). The interrupt-suppression state may be enabled by an acknowledgment from the processor. In addition, the interrupt-suppression state may suppress interrupts to the processor until a pre-specified threshold is met. For example, the interrupt-suppression state may be enabled until a time interval has passed and/or the number of packets and/or bytes occupied by the packets in a buffer exceeds a certain percentage of the buffer's capacity. In addition, the time interval may be based on the attributes (e.g., type, source address, destination address) of packets received after the acknowledgment.

As a result, the time interval during which the interrupt-suppression state is enforced may vary based on the attribute(s) of the packet and/or the amount of data and/or packets in the buffer. For example, the time interval for the interrupt-suppression state may be determined based on the source address, destination address, and/or type of the packet. If the time interval has passed and/or the buffer fills with packets past a certain point, the interrupt-suppression state may be disabled. If the time interval has not passed, the interrupt-suppression state may continue to be enabled.

If the processor is in the interrupt-suppression state, subsequent interrupts to the processor are disabled to maintain the interrupt-suppression state (operation 510). If the processor is not in the interrupt-suppression state, an interrupt is transmitted to the processor to trigger processing of the packet by the processor (operation 506). After the processing is complete, an acknowledgment of the packet is received from the processor (operation 508), prompting the disabling of subsequent interrupts to the processor and the re-enabling of the interrupt-suppression state in the processor (operation 510).

Interrupts may continue to be suppressed (operation 512) during interaction with the processor. If interrupt suppression is to continue, packets may be received (operation 502), and interrupts may be transmitted based on the enabling or disabling of the interrupt-suppression state (operations 504-506). Acknowledgments of the interrupts may also be received (operation 508) and used to re-enable the interrupt-suppression state (operation 510). Interaction with the processor may thus continue until interrupt suppression is disabled and/or the processor is no longer used to process the packets.

Figure 6:
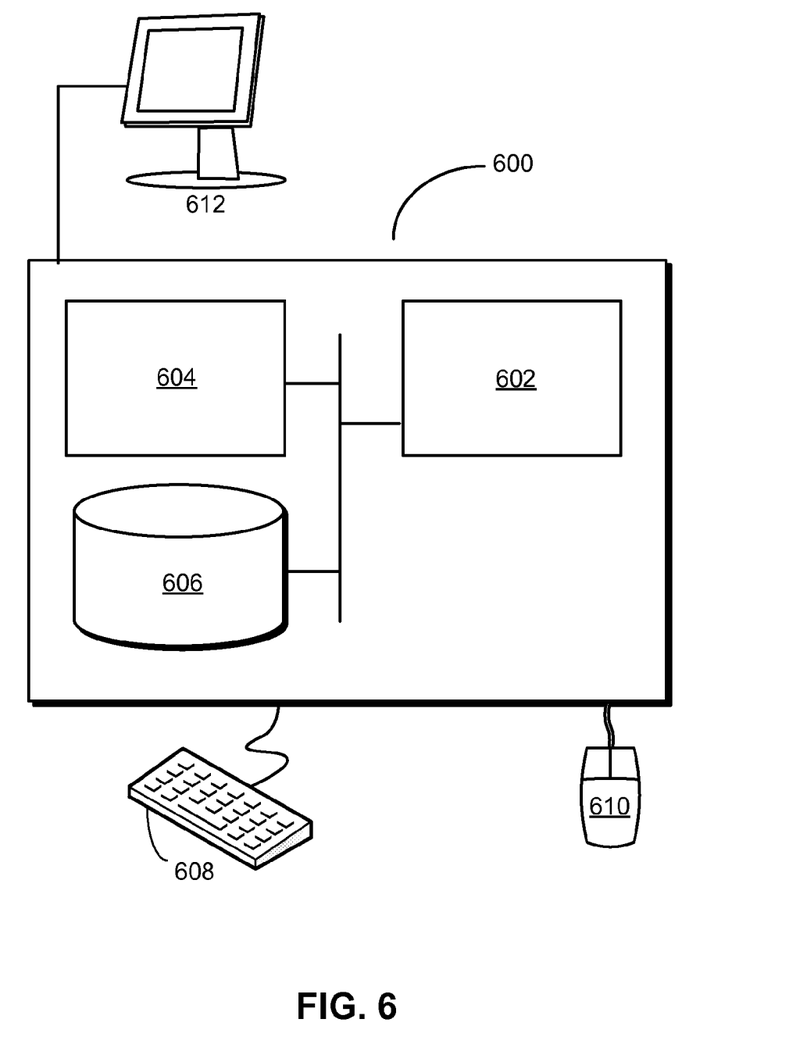
FIG. 6 shows a computer system in accordance with the disclosed embodiments.

FIG. 6 shows a computer system 600 in accordance with the disclosed embodiments. Computer system 600 may correspond to an apparatus that includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating efficient use of a processor.

The system may include a node that transmits a first interrupt to the processor upon receiving a first packet for processing at the processor and disables subsequent interrupts to the processor during an interrupt-suppression state in the processor. The system may also include the processor, which may process the first packet upon receiving the first interrupt and transmit a first acknowledgment of the first packet to the node to enable the interrupt-suppression state. The interrupt-suppression state may then be used to suppress subsequent interrupts from the node until a pre-specified threshold is met. For example, the interrupt-suppression state may be enforced until a time interval has passed and/or the amount of data in a buffer for the first packet exceeds a pre-specified level.

After receiving a second packet for processing at the processor, the node may transmit a second interrupt to the processor after the pre-specified threshold is met. The processor may then process the second packet upon receiving the second interrupt and transmit a second acknowledgment of the second packet to the node to re-enable the interrupt-suppression state. The node and processor may thus provide prompt processing of "first" packets while reducing the overall frequency of interrupts to the processor.

In addition, one or more components of computer system 600 may be remotely located and connected to the other components over a network. Portions of the present embodiments (e.g., node, processor, etc.) may also be located on different nodes of a distributed system that implements the embodiments. For example, the present embodiments may be implemented using a cloud computing system that manages the transmission of interrupts and acknowledgments among a set of remote components in one or more computer systems.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for suppressing interrupts in a computer system, comprising:
   receiving a first packet;
   receiving, at a processor, a first interrupt from a network interface based at least in part on the first packet;
   processing, at the processor, the first packet;
   enabling an interrupt-suppression state in the processor based at least in part on the processing the first packet, wherein the interrupt-suppression state suppresses subsequent interrupts from the network interface;
   receiving a second packet;
   disabling the interrupt-suppression state in the processor based at least in part on a pre-specified threshold being met, wherein the pre-specified threshold is based at least in part on a time interval, wherein the time interval is determined based at least in part on an attribute of the first packet, the attribute of the first packet based at least in part on a type of the first packet, a source address for the first packet, or a destination address for the first packet; and
   processing, at the processor, the second packet based at least in part on the disabling.

2. The method of claim 1, further comprising:
   after the second packet is processed, re-enabling the interrupt-suppression state in the processor.

3. The method of claim 2, wherein the re-enabling the interrupt-suppression state in the processor comprises:
   re-enabling the interrupt-suppression state in the processor until a second pre-specified threshold is met, wherein the second pre-specified threshold is based at least in part on a second time interval or an amount of received data stored in the network interface buffer, wherein the second time interval is determined based at least in part on an attribute of the second packet, the attribute of the second packet based at least in part on a type of the second packet, a source address for the second packet, or a destination address for the second packet.

4. The method of claim 1, wherein the enabling the interrupt-suppression state comprises:
   transmitting an acknowledgment of the first packet to the network interface, wherein the time interval is initiated after the acknowledgment is received by the network interface.

5. The method of claim 1, wherein the first interrupt is transmitted from the network interface in response to the processor not being in the interrupt-suppression state.

6. The method of claim 1, wherein the interrupt-suppression state is associated with at least one of:
   a low-power state of the processor; and
   thread-level processing at the processor.

7. The method of claim 1, wherein the pre-specified threshold is based at least in part on the time interval and an amount of received data stored in a network interface buffer.

8. A method for suppressing interrupts in a computer system, comprising:
   transmitting a first interrupt to a processor based at least in part on receiving a first packet associated with the first interrupt, wherein the first interrupt triggers processing of the first packet by the processor;
   upon receiving a first acknowledgment that the first packet was processed by the processor, disabling subsequent interrupts to the processor to enable an interrupt-suppression state in the processor;
   transmitting a second interrupt to the processor based at least in part on receiving a second packet associated with the second interrupt, wherein the second interrupt is transmitted to the processor after a pre-specified threshold associated with the interrupt-suppression state is met, wherein the pre-specified threshold is based at least in part on a time interval, wherein the time interval is determined based at least in part on an attribute of the first packet, the attribute of the first packet based at least in part on a type of the first packet, a source address for the first packet, or a destination address for the first packet; and
   transmitting a command to the processor to process the second packet based at least in part on the second interrupt and the processing of the first packet.

9. The method of claim 8, further comprising:
   upon receiving a second acknowledgment of the second packet from the processor, disabling subsequent interrupts to the processor to re-enable the interrupt-suppression state in the processor.

10. The method of claim 8, wherein transmitting the second interrupt to the processor after the pre-specified threshold is met comprises:
    transmitting the second packet after the time interval has passed.

11. A system for suppressing interrupts in a computer system, comprising:
a processor; and
a node configured to:
receive a first packet;
transmit a first interrupt to the processor based at least in part on the first packet;
disable subsequent interrupts to the processor during an interrupt-suppression state in the processor after the processor has processed the first packet;
receive a second packet;
transmit a second interrupt to the processor based at least in part on the second packet, wherein the second interrupt is transmitted to the processor after a pre-specified threshold associated with the interrupt-suppression state is met, wherein the pre-specified threshold is based at least in part on a time interval, wherein the time interval is determined based at least in part on an attribute of the first packet, the attribute of the first packet based at least in part on a type of the first packet, a source address for the first packet, or a destination address for the first packet; and
transmit a command to the processor to process the second packet based at least in part on the second interrupt and the processing of the first packet by the processor.

12. The system of claim 11, wherein the node is further configured to:
transmit a command to the processor to process the second packet based at least in part on the second interrupt, and
re-enable the interrupt-suppression state in the processor based at least in part on receiving a second acknowledgment that the second packet was processed by the processor.

13. The system of claim 11, wherein the first interrupt is transmitted from the node in response to the processor not being in the interrupt-suppression state.

14. The system of claim 11, wherein the interrupt-suppression state is associated with at least one of:
a low-power state of the processor; and
thread-level processing at the processor.

15. A computer-readable storage medium storing instructions that, when executed by a computer system, cause the computer system to perform a method for suppressing interrupts, the method comprising:
receiving a first packet;
receiving a first interrupt from a network interface at a processor based at least in part on the first packet;
processing the first packet at the processor;
enabling an interrupt-suppression state in the processor based at least in part on the processing the first packet, wherein the interrupt-suppression state suppresses subsequent interrupts from the network interface;
receiving a second packet;
disabling the interrupt-suppression state in the processor based at least in part on a pre-specified threshold being met, wherein the pre-specified threshold is based at least in part on a time interval, wherein the time interval is determined based at least in part on an attribute of the first packet, the attribute of the first packet based at least in part on a type of the first packet, a source address for the first packet, or a destination address for the first packet; and
processing the second packet received by the processor based at least in part on the disabling.

16. The computer-readable storage medium of claim 15, the method further comprising:
after the second packet is processed, re-enabling the interrupt-suppression state in the processor.

17. The computer-readable storage medium of claim 16, wherein the re-enabling the interrupt-suppression state in the processor comprises:
re-enabling the interrupt-suppression state in the processor until a second pre-specified threshold is met, wherein the second pre-specified threshold is based at least in part on a second time interval or an amount of received data stored in the network interface buffer, wherein the second time interval is determined based at least in part on an attribute of the second packet, the attribute of the second packet based at least in part on a type of the second packet, a source address for the second packet, or a destination address for the second packet.

18. The computer-readable storage medium of claim 15, wherein the enabling the interrupt-suppression state comprises:
transmitting an acknowledgment of the first packet to the network interface, wherein the time interval is initiated after the acknowledgment is received by the network interface.

19. A computer-readable storage medium storing instructions that, when executed by a computer system, cause the computer system to perform a method for suppressing interrupts, the method comprising:
transmitting a first interrupt to a processor based at least in part on receiving a first packet associated with the first interrupt, wherein the first interrupt triggers processing of the first packet by a processor;
upon receiving a first acknowledgment that the first packet was processed by the processor, disabling subsequent interrupts to the processor to enable an interrupt-suppression state in the processor;
transmitting a second interrupt to the processor based at least in part on receiving a second packet associated with the second interrupt, wherein the second interrupt is transmitted to the processor after a pre-specified threshold associated with the interrupt-suppression state is met, wherein the pre-specified threshold is based on a time interval, wherein the time interval is determined based at least in part on an attribute of the first packet, the attribute of the first packet based at least in part on a type of the first packet, a source address for the first packet, or a destination address for the first packet; and
transmitting a command to the processor to process the second packet based at least in part on the second interrupt and the processing of the first packet.

20. The computer-readable storage medium of claim 19, the method further comprising:
re-enabling the interrupt-suppression state in the processor based at least in part on receiving a second acknowledgment that the second packet was processed by the processor.

21. The computer-readable storage medium of claim 20, wherein the re-enabling the interrupt-suppression state in the processor comprises:
re-enabling the interrupt-suppression state in the processor until a second pre-specified threshold is met, wherein the second pre-specified threshold is based at least in part on a second time interval or an amount of received data stored in the network interface buffer, wherein the second time interval is determined based at least in part on an attribute of the second packet, the attribute of the second packet based at least in part on a type of the second packet, a source address for the second packet, or a destination address for the second packet.

22. The computer-readable storage medium of claim 19, wherein transmitting the second interrupt to the processor after the pre-specified threshold is met involves:
transmitting the second packet after the time interval has passed.

* * * * *